United States Patent [19]

Luick

[11] Patent Number: 5,644,780

[45] Date of Patent: Jul. 1, 1997

[54] MULTIPLE PORT HIGH SPEED REGISTER FILE WITH INTERLEAVED WRITE PORTS FOR USE WITH VERY LONG INSTRUCTION WORD (VLIN) AND N-WAY SUPERSCALER PROCESSORS

[75] Inventor: David Arnold Luick, Rochester, Minn.

[73] Assignee: International Business Machines Corporation, Armonk, N.Y.

[21] Appl. No.: 459,490

[22] Filed: Jun. 2, 1995

[51] Int. Cl.⁶ ............................ G06F 9/30; G06F 12/04; G06F 12/06

[52] U.S. Cl. .................. 395/800; 395/454; 395/484; 395/391; 364/DIG. 1; 364/DIG. 2

[58] Field of Search .................... 395/800, 200.01, 395/410, 478, 470, 285, 405, 484, 458, 452, 454, 287, 476, 376, 417, 391, 583, 567, 591, 709, 555; 364/DIG. 1, DIG. 2; 385/189.02, 230.05

[56] References Cited

U.S. PATENT DOCUMENTS

| | | | |
|---|---|---|---|
| 4,128,883 | 12/1978 | Duke et al. | 395/285 |
| 4,554,645 | 11/1985 | Furman | 365/189.02 |
| 4,558,433 | 12/1985 | Bernstein | 365/189.02 |
| 4,652,993 | 3/1987 | Scheuneman et al. | 395/478 |
| 4,766,535 | 8/1988 | Auerbach et al. | 395/492 |
| 4,811,296 | 3/1989 | Garde | 365/189.02 |
| 4,866,603 | 9/1989 | Chiba | 395/484 |
| 5,111,431 | 5/1992 | Garde | 365/189.02 |
| 5,204,841 | 4/1993 | Chappell et al. | 365/230.05 |
| 5,206,944 | 4/1993 | Pikenton | 395/405 |
| 5,276,848 | 1/1994 | Gallagher et al. | 395/448 |
| 5,289,427 | 2/1994 | Nicholes et al. | 365/230.05 |
| 5,481,495 | 1/1996 | Henkels et al. | 365/189.02 |
| 5,481,736 | 1/1996 | Schwartz et al. | 395/800 |

*Primary Examiner*—Daniel H. Pan
*Attorney, Agent, or Firm*—Joan Pennington

[57] ABSTRACT

A high speed register file is provided for use with Very Long Word Instruction (VLIW) and N-way superscaler processors. The high speed register file includes a selected number of copies of a general purpose register (GPR) building block. The GPR building block includes at least two interleaved sub-banks of registers. Each of the sub-banks includes a number N of write ports and a number M of read ports. The sub-banks are interleaved by write ports and have non-interleaved read ports.

13 Claims, 11 Drawing Sheets

5,644,780

MULTIPLE PORT HIGH SPEED REGISTER FILE WITH INTERLEAVED WRITE PORTS FOR USE WITH VERY LONG INSTRUCTION WORD (VLIW) AND N-WAY SUPERSCALER PROCESSORS

FIELD OF THE INVENTION

The present invention relates to a random access read/write memory (RAM) device with multiple read and write ports or a multiple port register file, and more particularly to a high speed register file including 64 or more ports and adapted for use with Very Long Word Instruction (VLIW) and N-way superscaler processors.

DESCRIPTION OF THE PRIOR ART

Known multiple or multi-port register files are inadequate for use with Very Long Word Instruction (VLIW) and N-way superscaler processors. VLIW processors consist of a series of arithmetic logic or functional units that can execute parts of instructions simultaneously. VLIW and N-way superscaler processors with 8, 16, or more pipeline functional units require a central register file for communication that must provide three or four ports per pipeline for perhaps a 64-port or more requirement. Current technology simply does not allow construction of a direct physical implementation of so many ports, especially with very stringent access and write time requirements. Currently the most ports physically wireable may be less than or equal to twenty (20).

SUMMARY OF THE INVENTION

A principal object of the present invention is to provide an improved multiple port register file for use with Very Long Word Instruction (VLIW) and N-way superscaler processors.

In brief, a high speed register file is provided for use with Very Long Word Instruction (VLIW) and N-way superscaler processors. The high speed register file includes a selected number of copies of a general purpose register (GPR) building block. The GPR building block includes at least two interleaved sub-banks of registers. Each of the sub-banks includes a number N of write ports and a number M of read ports. The sub-banks are interleaved by write ports and have non-interleaved read ports.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
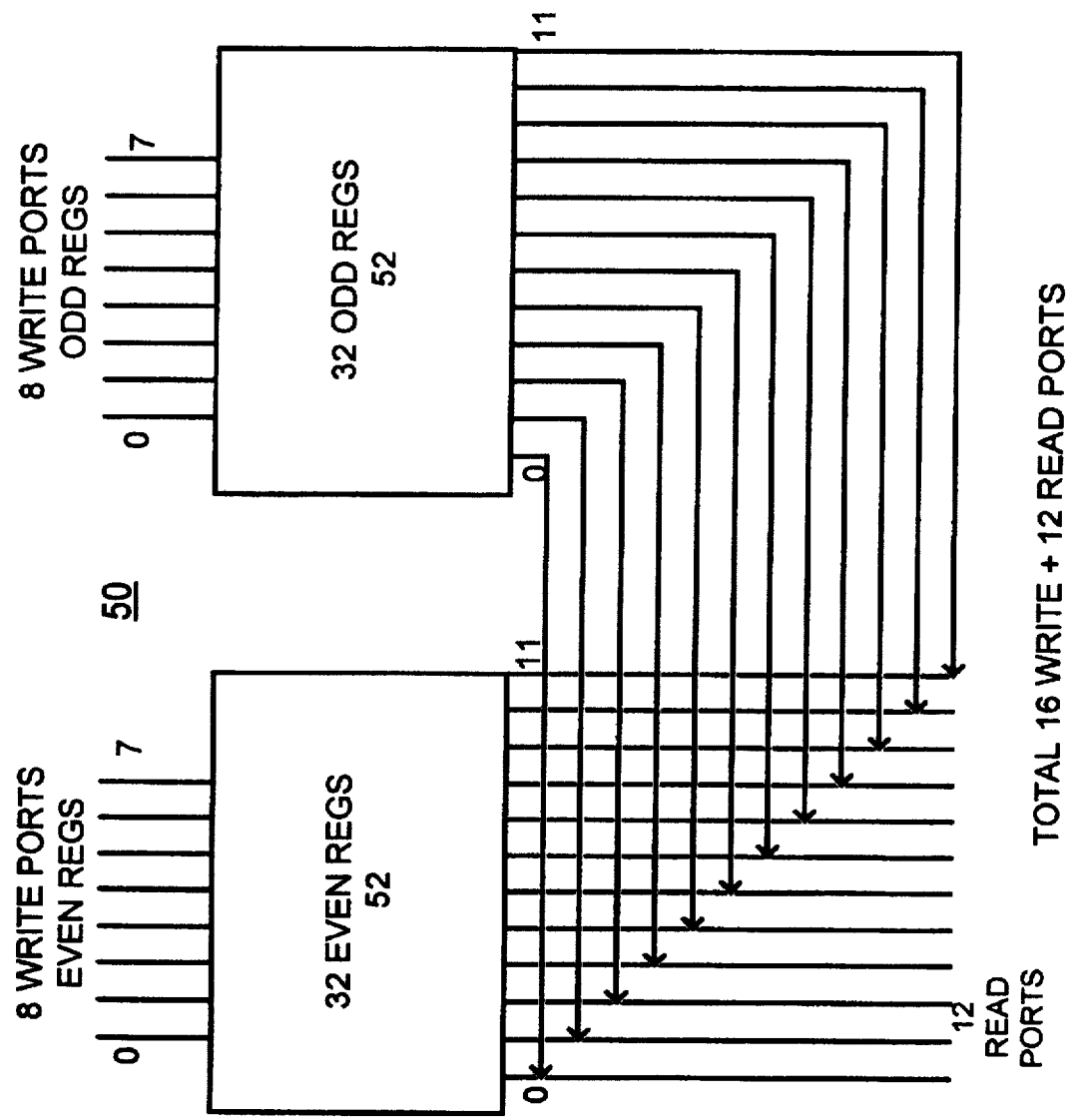
FIG. 1 is a block diagram illustrating a pair of twenty port general purpose register (GPR) file physical building blocks in accordance with the invention.

Having reference now to the drawings, FIG. 1 illustrates a twenty-eight port general purpose register (GPR) file logical building block in accordance with the invention generally designated by the reference character 50. In accordance with a feature of the invention, interleaving of write ports, specifically into even and odd sub-banks of registers as seen by write ports is employed. The GPR register file building block 50 of depth 32 yields a total of 16 available write ports and 12 available read ports.

GPR file logical building block 50 includes a pair of twenty port GPR file physical building blocks 52. The twenty port GPR file physical building blocks 52 include interleaved write ports of an even GPR sub-bank 52 and an odd GPR sub-bank 52. The GPR sub-banks 52 provides 12 read ports and 8 write ports with one sub-bank of 32 even registers and 8 write ports with another sub-bank of 32 odd registers. The GPR register file building block 50 includes sixteen physical write ports and twelve physical read ports that are used to construct a 64-port GPR logical register file generally designated by 60 in FIG. 2 with excellent performance characteristics.

Figure 2:
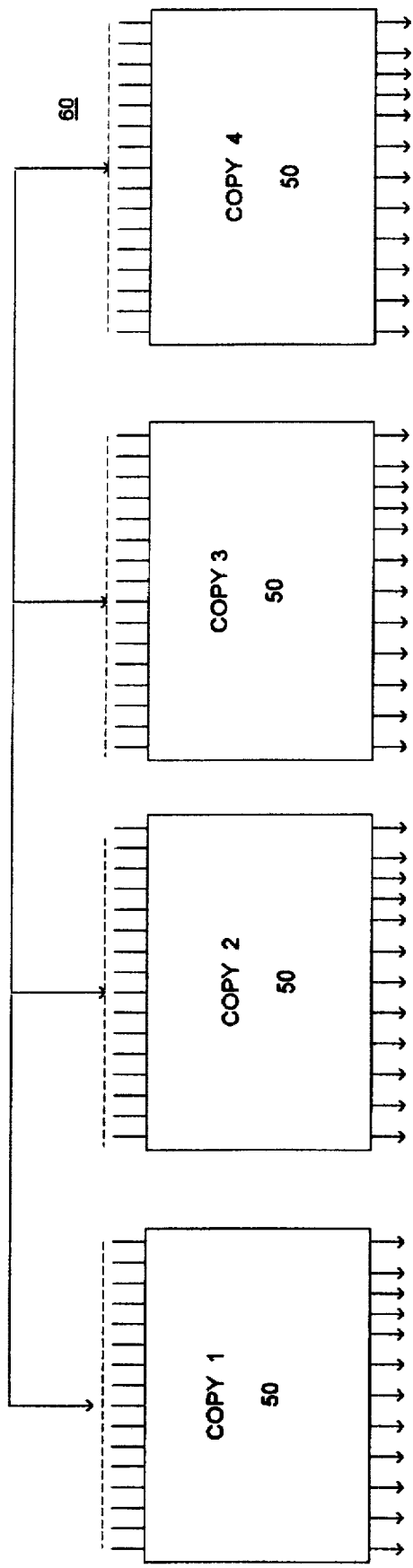
FIG. 2 is a block diagram illustrating a sixty-four port register file including four copies of the twenty-eight port logical GPR file logical building block of FIG. 1.

Referring now to FIG. 2, the sixty-four (64) port general purpose register file 60 includes four copies of the twenty-eight port register file logical building block 50 of FIG. 1. With the GPR file logical building block 50 copied four times, a 4-fold increase in read ports is provided for a required number of 48 total read ports. For the 64-deep register file 60, the 64 registers are divided into two groups; one group of 32 even and one group of 32 odd-numbered registers. In use, this register file arrangement 60 allows the compiler to generate basic blocks of instructions that have an approximately equal number of odd and even-numbered target register operands through some combination of register allocation and renaming algorithm. In the case of tightly encoded VLIW instructions, each instruction parcel has either an even (even parcel) or odd target operand register file port permanently assigned, obviating the need for the last bit of the register address to be encoded in the instruction.

Write performance is improved in the interleave register file 60 since only an 8-way write selection is required, as compared with a 16-way write selection in an uninterleaved register file, before a write is performed in the target register. However, no increase in write ports is possible from copying since all copies receive all writes to remain valid copies. The GPR 64-port register file 60 also improves the actual read port performance of the register file since it places the copy 1, 2, 3 and 4 closest to the pipeline data flow it drives. A disadvantage of the copy strategy is that target operands must physically traverse the entire area of the four copies of GPR logical building blocks 50 in the register file 60 of FIG. 2.

Figure 3:
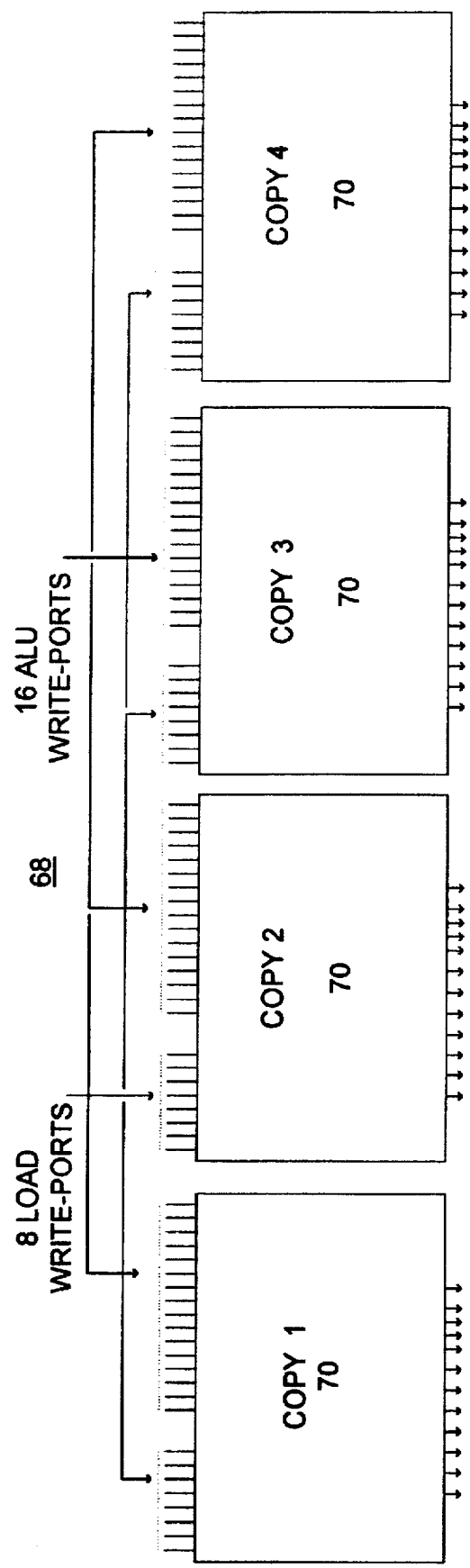
FIG. 3 is a block diagram illustrating a write port partitioning arrangement utilizing the GPR file building blocks of FIG. 1.

FIG. 3 is a block diagram illustrating a write port partitioning register file arrangement generally designated by 68 utilizing the four copies of the GPR building block 50. Each block 70 includes two GPR building blocks 52 with eight additional write paths or ports into each cell. In the register file 68, any load can write all copies 1, 2, 3 and 4 simultaneously and any ALU can write all copies 1, 2, 3 and 4 simultaneously. The arrangement 68 is impractical due to the required eight additional write ports required to provide 16 ALU write ports and 8 load write ports.

Figure 4:
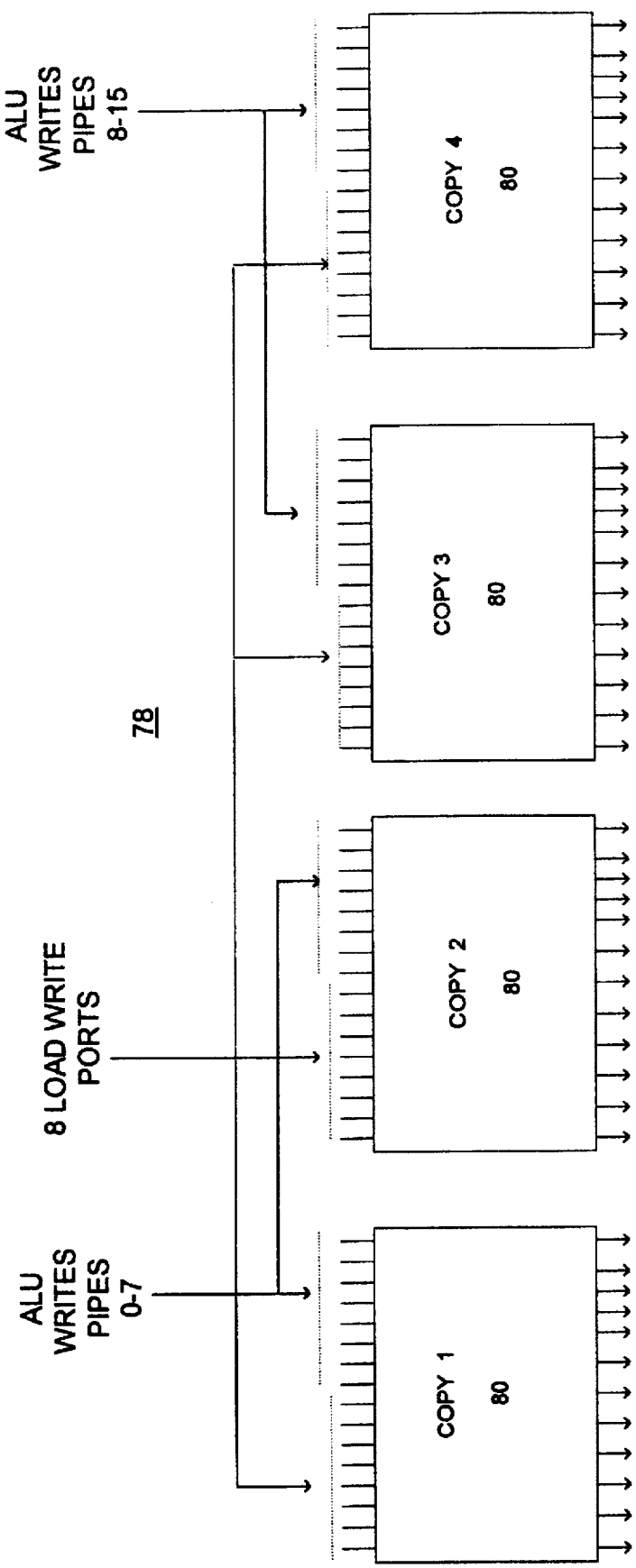
FIG. 4 is a block diagram illustrating an alternative reduced write port partitioning register file arrangement of the invention utilizing the GPR file building blocks of FIG. 1.

FIG. 4 illustrates an alternative reduced write port partitioning register file arrangement generally designated by 78 including four blocks 80. Each block 80 includes two ½ blocks or sub-banks 52 or one block 50. In copies 1 and 2, one of the sub-banks 52 is used for ALU writes pipes 0–7 and the other sub-bank 52 is used for 8 load write ports. In copies 3 and 4, one of the sub-banks 52 is used for ALU writes pipes 8–15 and the other sub-bank 52 is used for 8 load write ports. The partitioning arrangement 78 of FIG. 4 provides a practical solution requiring a total of sixteen write ports, rather than the impractical arrangement 68 of FIG. 3 that requires a total of 24 write ports. A sophisticated compiler can limit target writes only to two of the four copies 80 in a given cycle. For ALU operations producing target results that must be written to the register file 78, the compiler arranges to have all or most of the work of a basic block confined to either the first eight pipelines 0–7 or the second eight pipelines 8–15 of the sixteen total pipeline slots or pipes in a VLIW processor.

Each group of two copies 80 of the register file 78 need only receive the ALU target results from one half of the sixteen pipes; either eight pipes 0–7 or eight pipes 8–15, reducing the total number of write ports required by eight per copy. Additional read ports are not particularly expensive; however, additional global write ports are very expensive since they impact all copies 1, 2, 3 and 4 with extra input ports. When pipes 8–15 need to look at a result from pipes 0–7 and vice versa, the compiler schedules move register operations and schedules register references appropriately so that pipe stalls for this reason are totally avoided.

Figure 5:
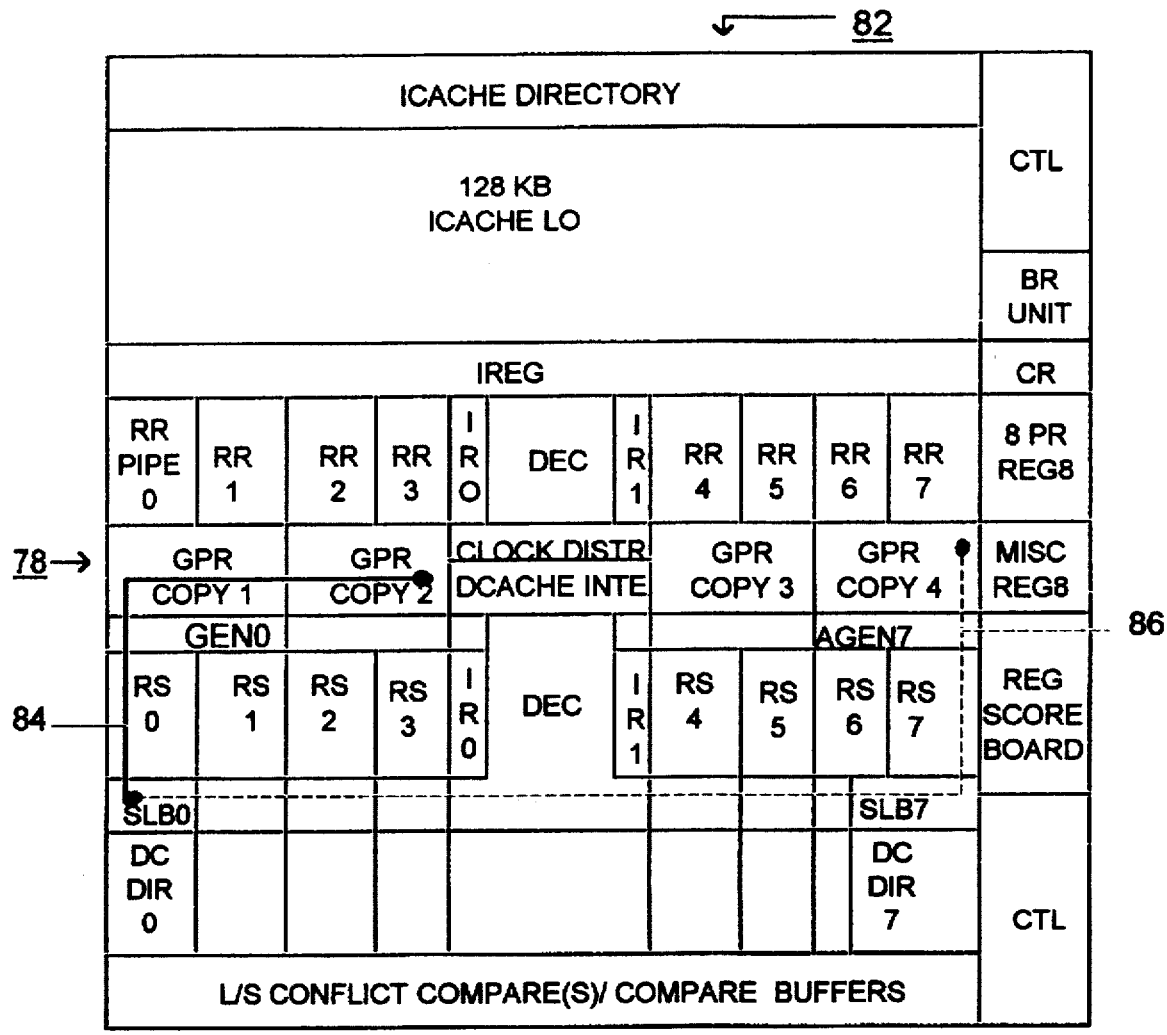
FIG. 5 is a block diagram illustrating a Very Long Word Instruction (VLIW) processor unit including the sixty-four port register file of FIG. 4.

FIG. 5 is a block diagram illustrating a VLIW processor unit generally designated by 82 including the sixty-four port GPR file 78. Another significant benefit from the ALU target partitioning scheme illustrated in FIG. 5 is a substantial reduction in the total bus wire length required to get any ALU result to any write port, as well as reduced loading requirements, two versus, four without the write port partitioning. A line labeled 84 represents a longest ALU write bus wire required with the partitioned register file 78. A dotted line labeled 86 represents a longest ALU write bus wire required with the non-partitioned register file 60. In the partitioned ALU target register file 78, at worst, an ALU need only drive to its own and an adjacent register file copy as opposed to driving to its next adjacent copy in the non-partitioned arrangement. This also potentially allows these bus wires to be double thickness and double width wires. The thicker and wider wires have lower resistance to provide better performance and also because the bus wires may run only about one-half length as compared to a non-partitioned register file arrangement. Write port target partitioning is explicitly not used for cache data load write ports. This is so partly because in commercial environments, performance is often limited by the number of load pipes available, not the number of ALUs. Thus, ALU operations can be duplicated in each ALU target partition with little interference, loads cannot. Also, many load dependency cases exist, for example, linked lists, so that latency is quite important. There is almost no cycle time/wire delay difference for the cache data load case because the data busses are already long wires with high-current drivers. Driving four register file copies versus only two causes an insignificant change in bus delay, especially given that load paths are already two cycle paths.

Figure 6:
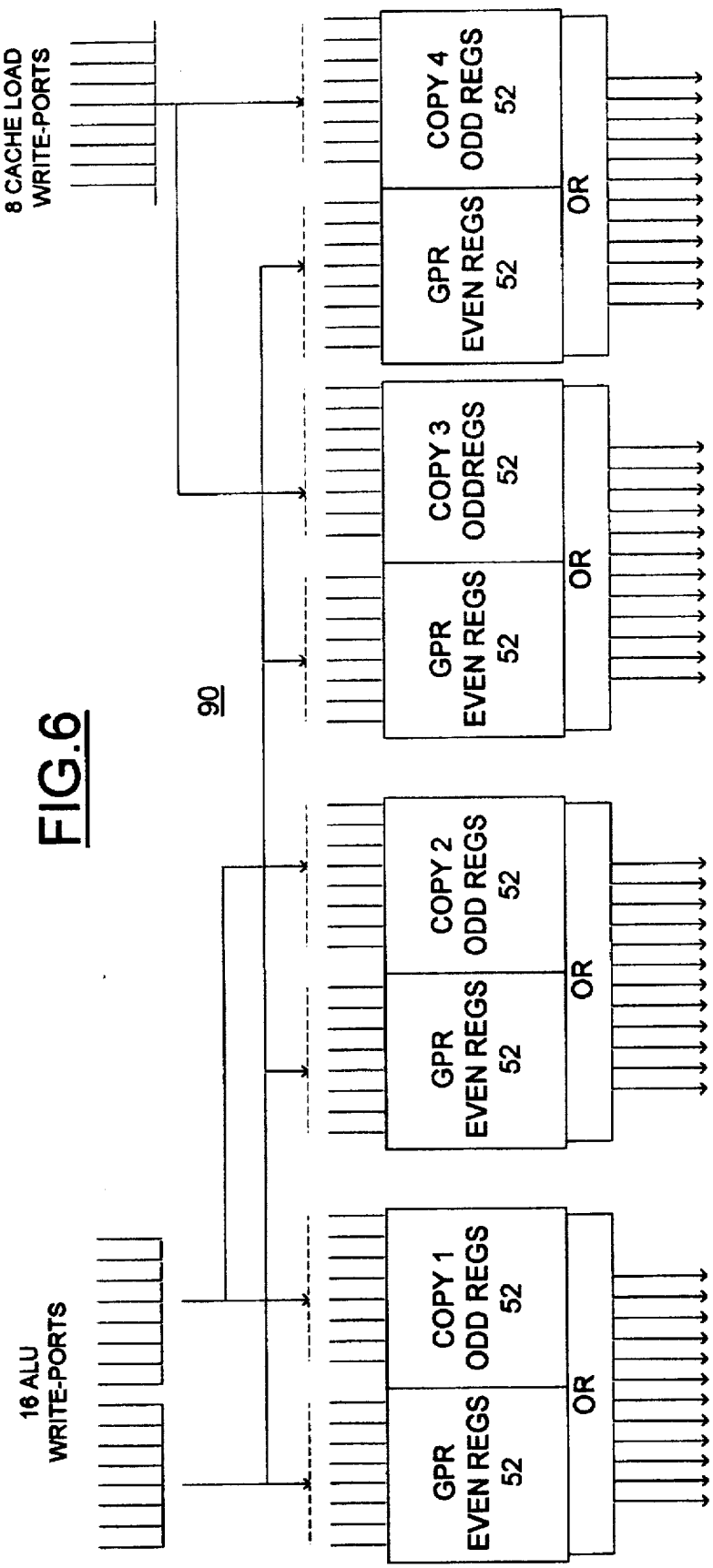
FIG. 6 is a block diagram illustrating a seventy-two port register file including four copies of the twenty eight port register file building block of FIG. 1.

FIG. 6 illustrates a seventy-two port register file generally designated by 90 including four copies of the twenty eight port GPR file logical building block 50 of FIG. 1. In FIG. 6, the completed register file layout includes eight of the basic 20-port GPR sub-banks 52 yielding a logical register file capable of a maximum of 48 reads and 24 writes per cycle for a total of 72 logical ports with very fast read access and write-through performance capability.

Figure 7:
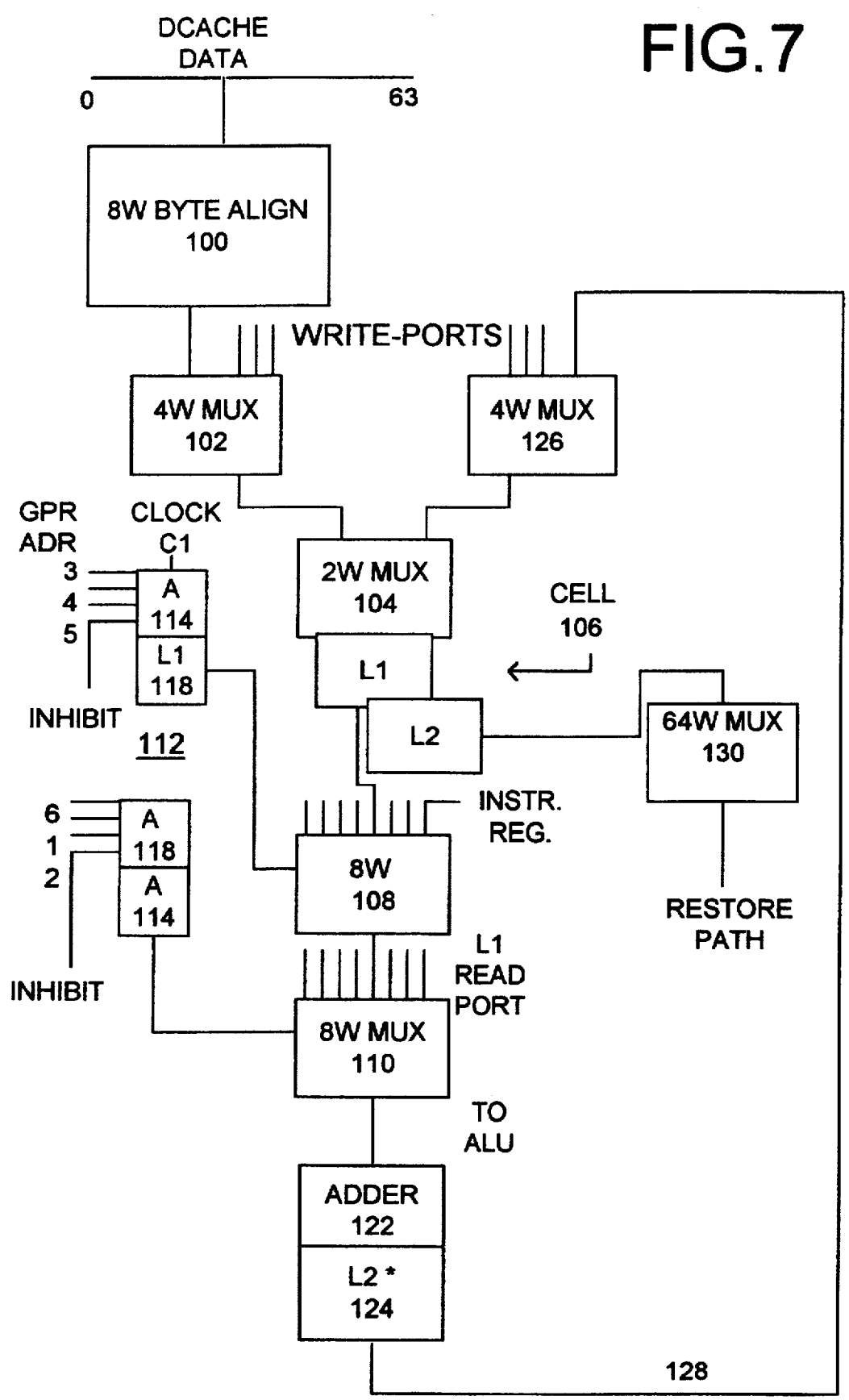
FIG. 7 is a schematic diagram illustrating a cell of the register file building block of FIG. 1 together with an address decode and an arithmetic and logic unit (ALU) adder.

FIG. 7 is a schematic diagram illustrating a cell of the register file building block 52 of FIG. 1. A DCACHE data input is applied to an 8-way byte align 100 that is connected at its output to a 4-way multiplexer (MUX) 102. MUX 102 is connected to a 2-way multiplexer (MUX) 104 that together define an 8-way MUX function included in a cell 106. Cell 106 includes a pair of latches, shown as L1 and L2 latches or a shift register latch. The L1 latch is connected to a 8-way MUX 108 that is connected at its output to a 8-way MUX 110. A GPR address decoder generally designated by 112 including a pair of address buffers 114, 116 and address L1 latches 118, 120 applies address signals to the MUXs 108 and 110. A C1 clock output is used to set the address buffers 114, 116 for the L1 and L2 latches 118 and 120. The output of MUX 110 is applied to an adder 122 that is connected to an L2* latch 124 of an associated arithmetic logic unit (ALU). The output of the L2* latch 124 is applied to a 4-way MUX 126 that is connected to the 2-way MUX 104 via a global network wire labeled 128. In a complementary metal oxide semiconductor (CMOS) integrated circuit implementation with six levels of metallization, the global network wire 128 can be fifth level of metal and made thicker, and for example, twice the standard wiring width. The cell output of L2 latch 106 is applied to a 64-way MUX 130 that provides a restore path.

Figure 8:
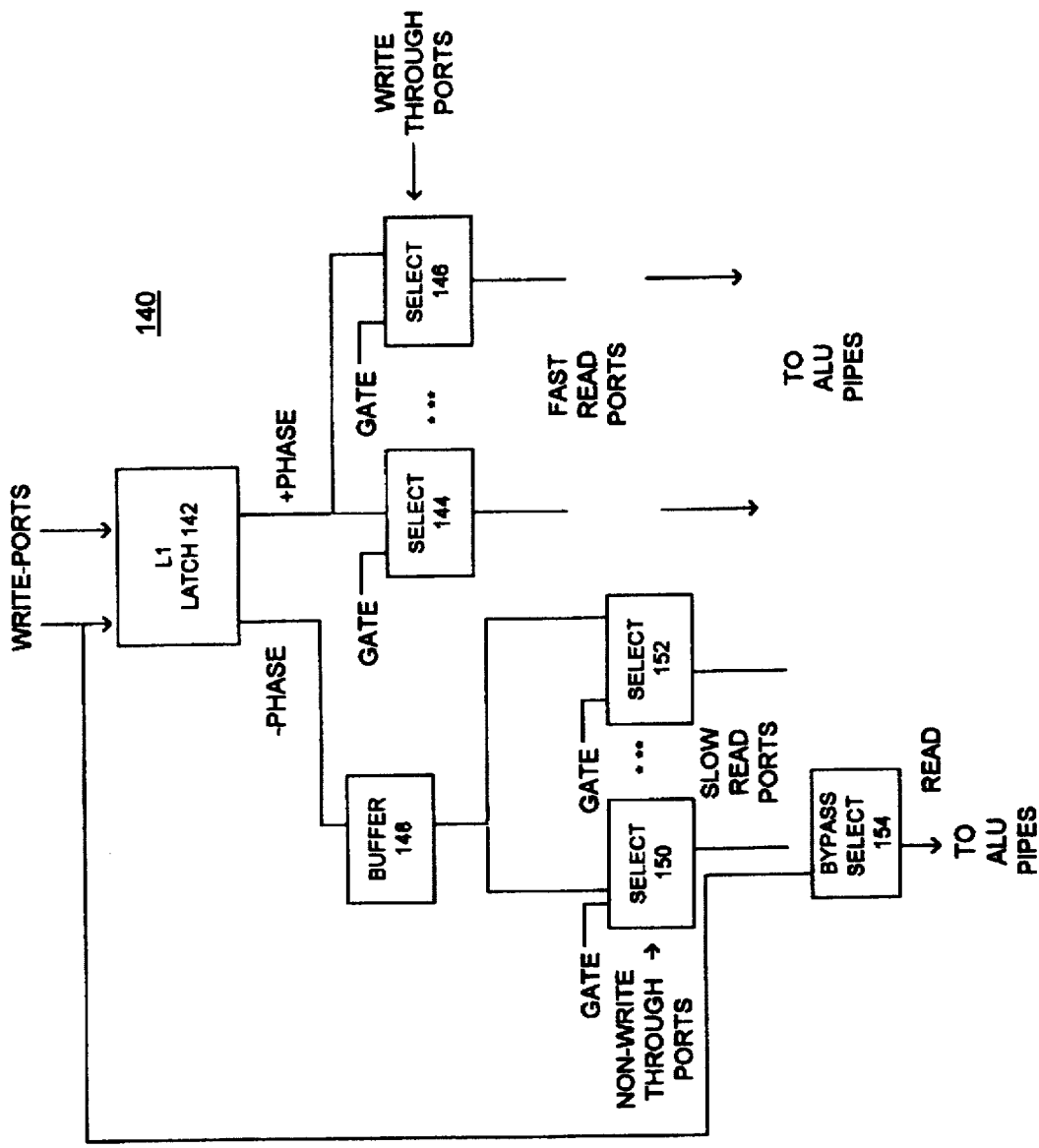
FIG. 8 is a schematic diagram illustrating a variable performance read access in accordance with the invention of the GPR file building block of FIG. 1.

FIG. 8 illustrates a variable read port performance feature of the invention. For each register file copy 50, not all the twelve read ports have the same performance requirements. Eight of the read ports are required to be write through and as fast as possible. Four of the fast read ports feed the right input of the ALU and as such must have the true and complement function for subtract and other functions. The other four fast read ports feed the other ALU input (not complemented) and the CACHE logic (machine critical path) and also are made as fast as possible. An L1 latch 142 provides two latch phases, –PHASE and +PHASE. The L1 latch +PHASE is used to drive a plurality of read port selectors 144 and 146, providing fast L1 write through ports. The write through ports pass data from a write port to the read port in the same clock cycle. Also the compiler can guarantee that no more than two output read selectors will access the same register on any given cycle, limiting the current that must be provided and improving performance further. The L1 latch –PHASE is used to drive a buffer 148 that is coupled to a pair of selects 150 and 152, providing the four slow L2 read ports that are non-write though and do not have stringent performance requirements as they are used for either store register data access or to load exception save restore registers, both requiring noncritical timings. The four slow read ports can tolerate longer, thinner, and more irregular wire bussing which gives the designer an additional degree of freedom. A bypass select 154 coupled to the write port provides fast read ports to the ALU pipes.

Figure 9:
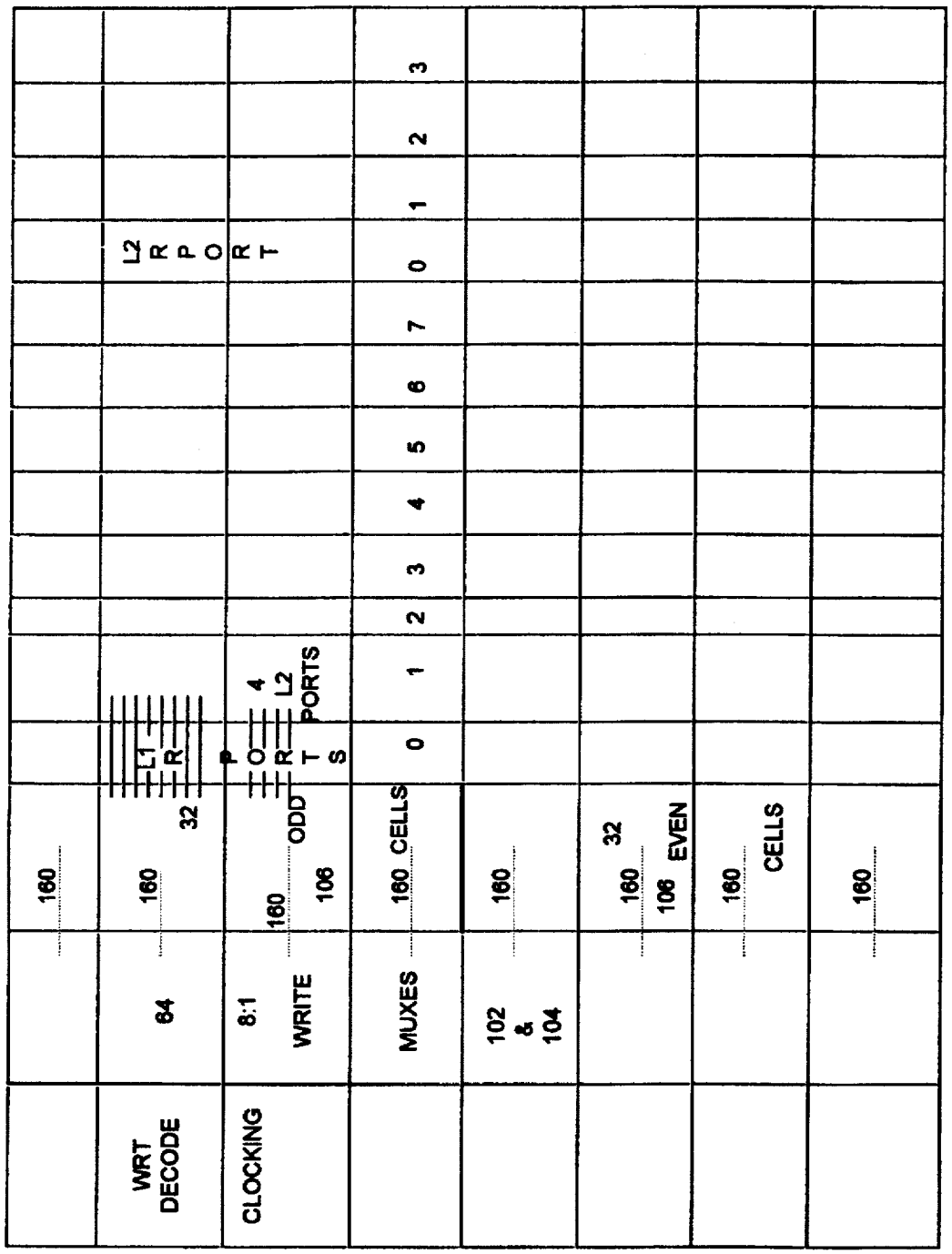
FIG. 9 is an exemplary layout of the GPR file building blocks of FIG. 1 bit 0.

FIG. 9 provides an exemplary layout of the GPR file logical building block 50 of FIG. 1 bit 0. Near the middle of the layout, 64 GPR register cells are shown divided into 32 odd cells 106 and 32 even cells 106. An adjacent column of 8:1 multiplexers defining 4-way and 2-way MUXs 102, 126 and 104 is connected to the even and odd cells 106 by a plurality of write lines indicated by example lines labeled 160. Eight L1 read ports and four L2 read ports are illustrated with lines indicating example connection of the cells 106 to the read ports.

Figure 10:
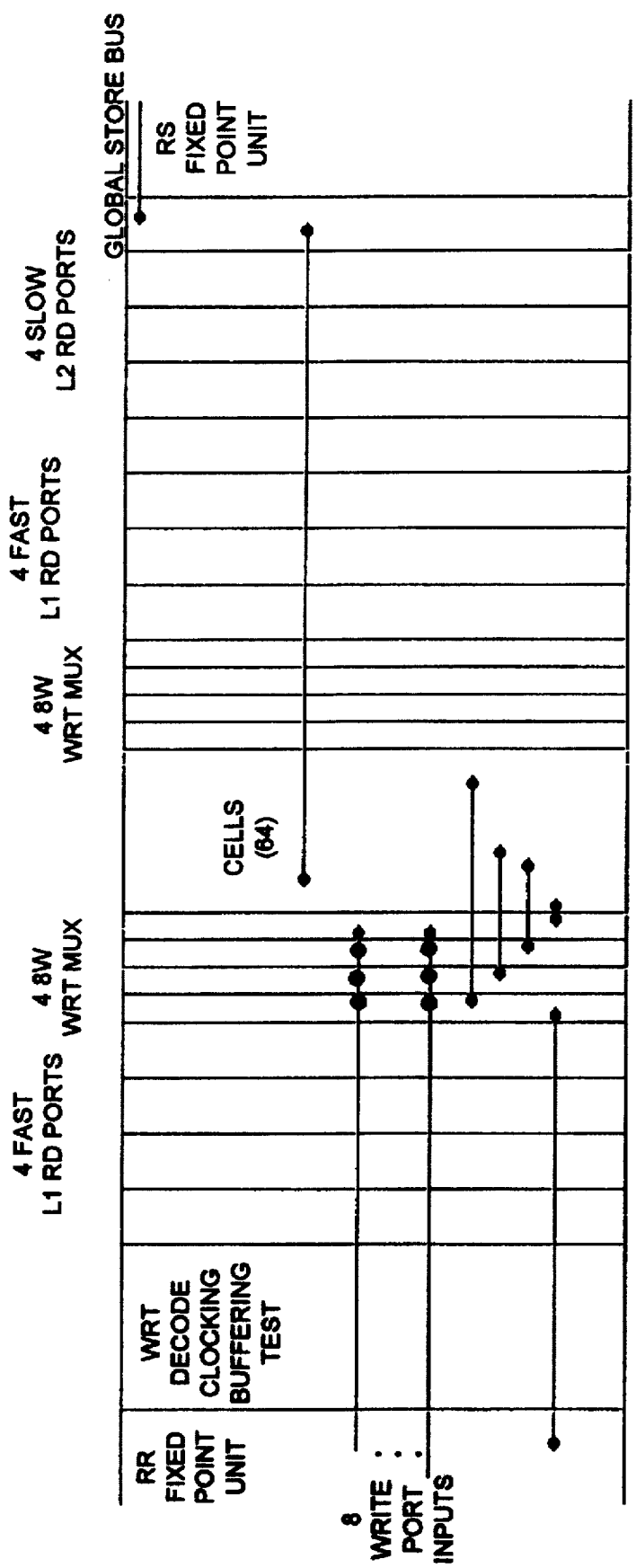
FIG. 10 is another exemplary layout of the GPR file building blocks of FIG. 1 bit 0 illustrating an alternative read port layout in accordance with the invention.

Referring to FIG. 10, another exemplary layout of the GPR file logical building block 50 of FIG. 1 bit 0 illustrates an alternative read port layout in accordance with the invention. As depicted and described with respect to FIG. 8, GPR file logical building block 50 includes eight fast L1 read ports and four slow L2 read ports. Four fast L1 read ports are provided between the write decode, clocking, buffering and test and a first four eight-way write MUXs. Four fast L1 read ports are provided between a second four eight-way write MUXs and the four slow L2 read ports. Exemplary connecting lines are shown between eight write port inputs and the first four eight-way MUXs, these eight-way MUXs and the cells and the cells and one of the four slow L2 read ports.

Figure 11:
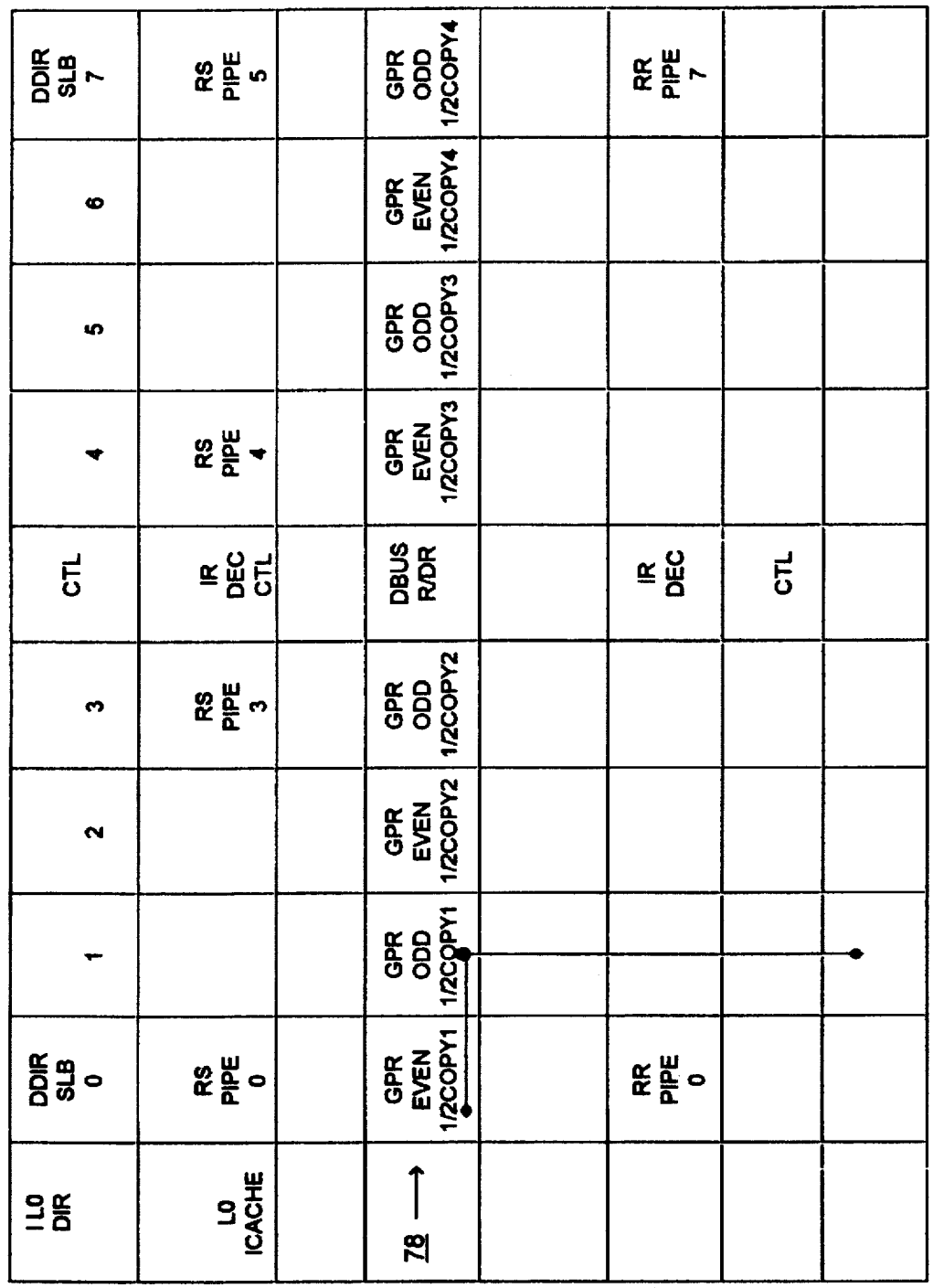
FIG. 11 is a schematic diagram illustrating an exemplary layout of a processor unit including the GPR file building blocks of FIG. 1.

FIG. 11 is a schematic diagram illustrating an exemplary layout of a processor unit including the GPR file 78. In FIG. 11, the partitioned GPR file 78 is shown generally centrally located above the register/register (RR) pipes 0-7 and below the register/storage (RS) pipes 0-5 and an associated DECACHE directory (DDIR) and segment look-aside buffers (SLBs) 0-7. An exemplary wire is illustrated between the even and odd GPR ½ copies 1 (sub-banks 52 in FIG. 1) and a decode and control area that can be provided with thicker wire, for example, two times standard width.

While the present invention has been described with reference to the details of the embodiments of the invention shown in the drawing, these details are not intended to limit the scope of the invention as claimed in the appended claims.

What is claimed is:

1. A high speed register file for use with Very Long Instruction Word (VLIW) and N-way superscaler processors comprising:

a general purpose register (GPR) building block, said GPR building block including at least two interleaved sub-banks of registers, each of said sub-banks including a number N of physical write ports and a number M of physical read ports; said sub-banks being interleaved by write ports to provide two times said number N of write ports for said GPR building block and said sub-banks having non-interleaved read ports; and a selected number of copies of said GPR building block.

2. A high speed register file as recited in claim 1 wherein said general purpose register (GPR) building block includes an odd sub-bank of registers including said number N of odd write ports and an even sub-bank of registers including said number N of even write ports.

3. A high speed register file as recited in claim 1 wherein said selected number of said copies are combined into predetermined groups.

4. A high speed register file as recited in claim 3 wherein the VLIW processor includes sixteen arithmetic and logic units (ALUs) 0-15 and wherein either a first eight ALUs 0-7 or a second eight ALUs 8-15 writes to predefined ones of said predetermined groups.

5. A high speed register file as recited in claim 4 wherein said selected number of said copies equals four and said first eight ALUs 0-7 writes to two of said copies and said second eight ALUs 8-15 writes to the other two of said four copies.

6. A high speed register file as recited in claim 1 wherein said M read ports of said at least two interleaved sub-banks of said registers defining said GPR building block are Ored together, providing M read ports for said GPR building block.

7. A high speed register file as recited in claim 1 wherein said general purpose register (GPR) building block includes said number M of read ports and wherein said selected number of said copies equals four, providing a total of four times M read ports.

8. A high speed register file as recited in claim 7 wherein said number M of read ports equals 12, providing a total of 48 read ports.

9. A high speed register file as recited in claim 1 wherein said selected number of copies equals four, copy 1, copy 2, copy 3 and copy 4, and wherein the VLIW processor includes sixteen arithmetic and logic units (ALUs) 0-15 and wherein a first eight ALUs 0-7 write to copies 1 and 2 and wherein a second eight ALUs 8-15 write to copies 3 and 4.

10. A high speed register file as recited in claim 1 wherein said number M of said read ports include both write through ports and non-write through ports.

11. A high speed register file for use with Very Long Instruction Word (VLIW) and N-way superscaler processors comprising:

a general purpose register (GPR) building block, said GPR building block including at least two interleaved sub-banks of registers, each of said sub-banks including a number N of physical write ports and a number M of physical read ports; said sub-banks being interleaved by write ports to provide two times said number N of write ports for said GPR building block and said sub-banks having non-interleaved read ports;

a selected number of copies of said GPR building block; wherein said selected number of copies equals four, copy 1, copy 2, copy 3 and copy 4, and wherein the VLIW processor includes sixteen arithmetic and logic units (ALUs) 0-15 and wherein a first eight ALUs 0-7 write to copies 1 and 2 and wherein a second eight ALUs 8-15 write to copies 3 and 4; and wherein said four copies copy 1, copy 2, copy 3 and copy 4 are coupled to a CACHE memory for providing CACHE load writes to all of said four copies.

12. A high speed register file as recited in claim 1 wherein the VLIW processor includes sixteen pipelines 0-15 and wherein said selected number of copies equals four, copy 1, copy 2, copy 3 and copy 4; and wherein said copies 1 and 2 are connected to said pipelines 0-7 and said copies 3 and 4 are connected to said pipelines 8-15.

13. A high speed register file as recited in claim 12 wherein each of said copies are connected to said pipelines by eight write ports.

* * * * *

UNITED STATES PATENT AND TRADEMARK OFFICE
CERTIFICATE OF CORRECTION

PATENT NO. : 5,644,780

DATED : July 1, 1997

INVENTOR(S) : David Arnold Luick

It is certified that error appears in the above-identified patent and that said Letters Patent is hereby corrected as shown below:

On the title page, item [54] and column 1, line 4, "(VLIN)" should be --(VLIW)--.

Signed and Sealed this

Second Day of September, 1997

Attest:

BRUCE LEHMAN

Attesting Officer

Commissioner of Patents and Trademarks